US008078388B2

(12) United States Patent
Powell

(10) Patent No.: US 8,078,388 B2
(45) Date of Patent: Dec. 13, 2011

(54) FARADAY TYPE WIRELESS OXYGEN SENSOR

(75) Inventor: Patrick Powell, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 526 days.

(21) Appl. No.: 12/349,890

(22) Filed: Jan. 7, 2009

(65) Prior Publication Data

US 2010/0174455 A1 Jul. 8, 2010

(51) Int. Cl.
*B60T 7/12* (2006.01)
*G05D 1/00* (2006.01)
*G06F 7/00* (2006.01)
*G06F 17/00* (2006.01)

(52) U.S. Cl. ................ 701/109; 701/1; 422/94; 422/90; 422/95; 422/98; 73/23.01; 73/23.03; 73/23.05; 73/31.06

(58) Field of Classification Search .................. 73/1.02, 73/1.06, 19.01–19.12, 23.2, 23.21–23.35, 73/335.02, 335.03, 335.04, 335.05, 35.01–35.13, 73/861.11, 861.15
See application file for complete search history.

(56) References Cited

U.S. PATENT DOCUMENTS

| | | | |
|---|---|---|---|
| 6,642,720 B2 | 11/2003 | Maylotte et al. |
| 6,662,642 B2 | 12/2003 | Breed et al. |
| 6,663,011 B1 | 12/2003 | Entleutner |
| 6,988,026 B2 | 1/2006 | Breed et al. |
| 7,039,491 B1 | 5/2006 | Delbrugge, Jr. |
| 7,127,935 B2 | 10/2006 | Bonne et al. |
| 7,231,180 B2 | 6/2007 | Benson et al. |
| 7,286,058 B1 | 10/2007 | Gologorsky |
| 7,313,467 B2 | 12/2007 | Breed et al. |

*Primary Examiner* — Khoi Tran
*Assistant Examiner* — Bhavesh V Amin
(74) *Attorney, Agent, or Firm* — Harness, Dickey & Pierce, PLC

(57) ABSTRACT

An oxygen sensor device and method for a motor vehicle having an electrode within an outer shell for measuring oxygen in exhaust gas exiting the vehicle. A communication device, powered by a capacitor, wirelessly transmits the measured amount of oxygen from the electrode to a powertrain control module. Vibration transmitting from the motor vehicle shakes a magnet, wound inside a coil, for generating the electrical current used by the capacitor.

20 Claims, 5 Drawing Sheets

FARADAY TYPE WIRELESS OXYGEN SENSOR

FIELD

The present disclosure relates to a self-powered oxygen sensor and, more particularly to a wireless oxygen sensor using Faraday-type power generation.

BACKGROUND

This section provides background information related to the present disclosure which is not necessarily prior art. Oxygen sensors are commonly used in automotive vehicle applications to improve fuel economy, ensure smooth performance, and reduce exhaust emissions. More specifically, oxygen sensors are typically located in the exhaust system before and after the exhaust catalyst in order to determine catalyst efficiency. In this way, pre-catalyst and post-catalyst signals may be monitored and adjusted to meet emissions regulations. Most vehicles today include from 2 to 4 oxygen sensors, but additional sensor use is anticipated as emissions regulations become more stringent.

In operation, the oxygen sensor has a ceramic cylinder tip that measures the proportion of oxygen in the exhaust gas flowing out of the engine. Oxygen sensor measurements are most accurate when the sensor is heated to approximately 315-800° C. (600-1,472° F.), depending upon the type of oxygen sensor that is utilized. Accordingly, most sensors include heating elements to allow the sensor to reach an ideal temperature more quickly when the exhaust is cold. The temperature of the ceramic portion of the sensor varies with respect to the exhaust gas temperature in order to maintain accuracy of the sensor signal.

After measuring the proportion of oxygen in the exhaust gas, the sensor then generates a voltage signal representing the difference between the exhaust gas and the external air (i.e. air-fuel ratio). Depending on the style of sensor, the sensor may, instead, create a change in resistance signal to convey the same information. The signal is transmitted through signal wires to a powertrain control module (PCM) where it is compared with the stoichiometric air-fuel ratio (e.g. 14.7:1 by mass for gasoline) to determine if the air-fuel ratio is rich (e.g. unburned fuel vapor) or lean (e.g. excess oxygen). The PCM can then vary the fuel injector output to affect the desired air-fuel ratio and ultimately to optimize engine performance and control vehicle emissions.

Oxygen sensors are typically powered through the various attached wires. For example, signal wires and heater wires may provide power to the sensor and the heating elements, respectively. As emissions regulations become more stringent and more sensors are used, additional wiring may be necessary. The additional wiring provides added complexity, increased assembly costs, and increased natural resource consumption (e.g. copper and plastics). Additionally, sensor failure may occur at the various sensor wires (e.g. power wires, heater wires) due to improper wiring, connector corrosion, or wire failure. When an oxygen sensor fails, the PCM can no longer sense the air-fuel ratio, which directly influences vehicle performance, such as by the consumption of excess fuel.

In addition to failure because of the various sensor wires, location of the oxygen sensors in the exhaust system can also lead to premature failure of the sensor. The exhaust pipe has natural vibration that comes primarily from engine rotation and combustion, but vibration may also be transmitted from the road surface through the vehicle body. Vibration may cause serious damage to the sensor and reduce its lifetime.

SUMMARY

This section provides a general summary of the disclosure, and is not a comprehensive disclosure of its full scope or all of its features. An oxygen sensor device and method for a motor vehicle may utilize an electrode within an outer shell for measuring oxygen in exhaust gas exiting the vehicle. A communication device, powered by a capacitor, wirelessly transmits the measured amount of oxygen from the electrode to a powertrain control module. Vibration transmitting from the motor vehicle shakes a magnet, located inside a coil, for generating the electrical current used by the capacitor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope of the invention to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. These example embodiments will now be described more fully with reference to the accompanying drawings.

Figure 1:
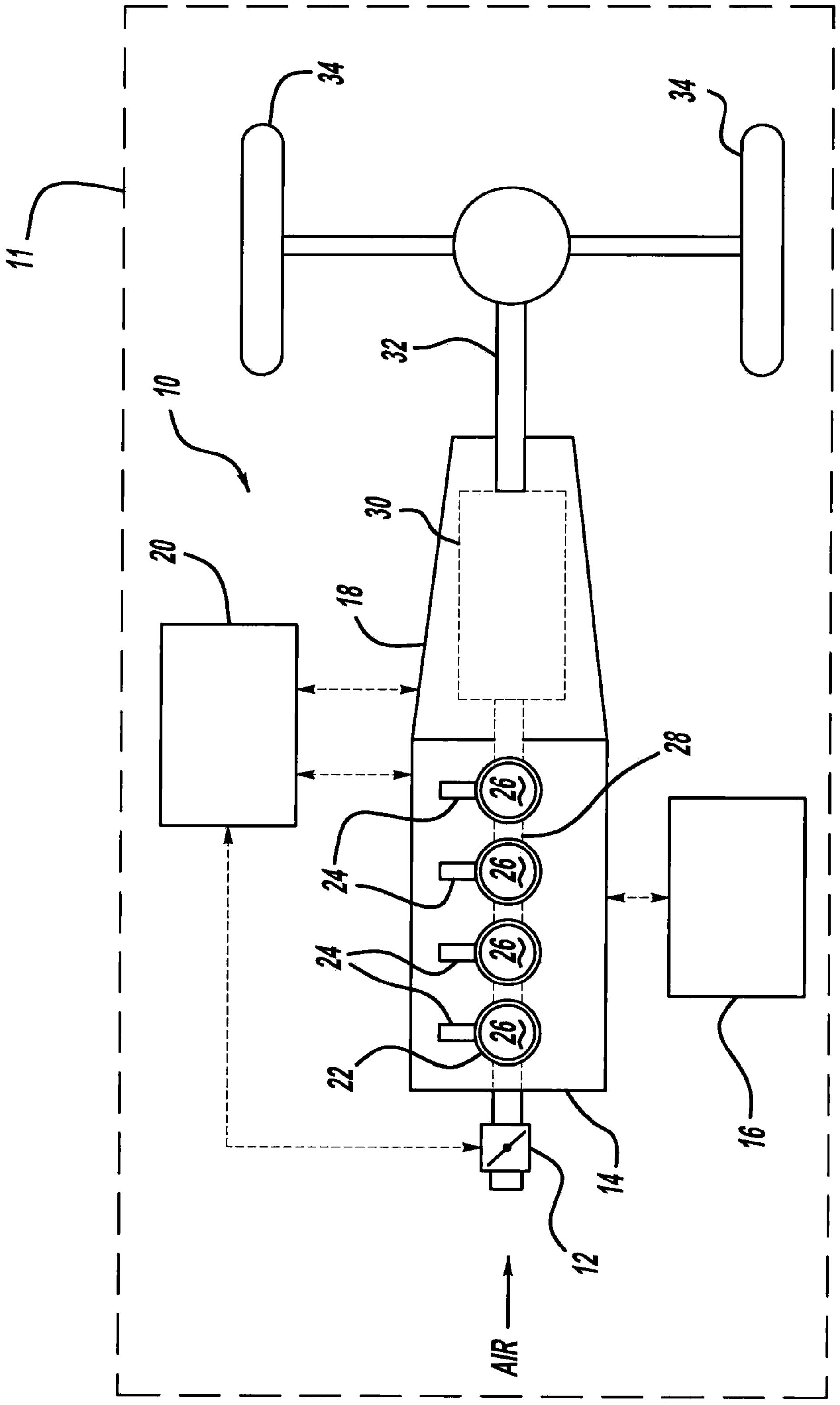
FIG. 1 is a functional block diagram of a vehicle drive system according to the present disclosure.

Referring now to FIG. 1, an exemplary vehicle drive system 10 of a vehicle 11 is depicted. The vehicle drive system 10 includes a throttle valve 12, an engine 14, an exhaust system 16, an automatic transmission 18, and a powertrain control module (PCM) 20. Air enters the vehicle drive system 10 through the throttle valve 12. The throttle valve 12, under direction from the PCM 20, regulates the amount of air flowing into the engine 14. The air is evenly distributed to N cylinders or combustion chambers 22 located in the engine 14. Although FIG. 1 depicts the engine 14 having four combustion chambers 22 (N=4), it should be understood that the engine 14 may include additional or fewer chambers 22. For example, the engine 14 may include from 1 to 16 chambers 22. Additionally, although PCM 20 is depicted, the functions of the PCM 20 could also be shared or divided between an engine control module (ECM) and a transmission control module (TCM).

The air entering the engine 14 combusts with fuel provided by fuel injectors 24 located above the combustion chambers 22. The PCM 20 varies the output of the fuel injectors 24 to optimize engine 14 performance. The combustion of the fuel and air reciprocally drives pistons 26 located within the combustion chambers 22. The reciprocating pistons 26 rotatably drive a crankshaft 28, which in turn, drives the transmission 18. The transmission 18 translates the drive torque through a series of gears 30 utilizing a plurality of gear ratios (e.g. 3-speed, 4-speed, 5-speed, 6-speed, etc.) to an output driveshaft 32. The driveshaft 32 then distributes the drive torque to vehicle wheels 34.

The combustion of fuel and air creates waste exhaust gases that are generally relatively harmless. However, a small amount of the gases include noxious or toxic pollutants, such as carbon monoxide (CO), hydrocarbons (HC), and nitrogen oxides ($NO_x$), that must be conveyed away from the engine 14 through the exhaust system 16.

Figure 2:
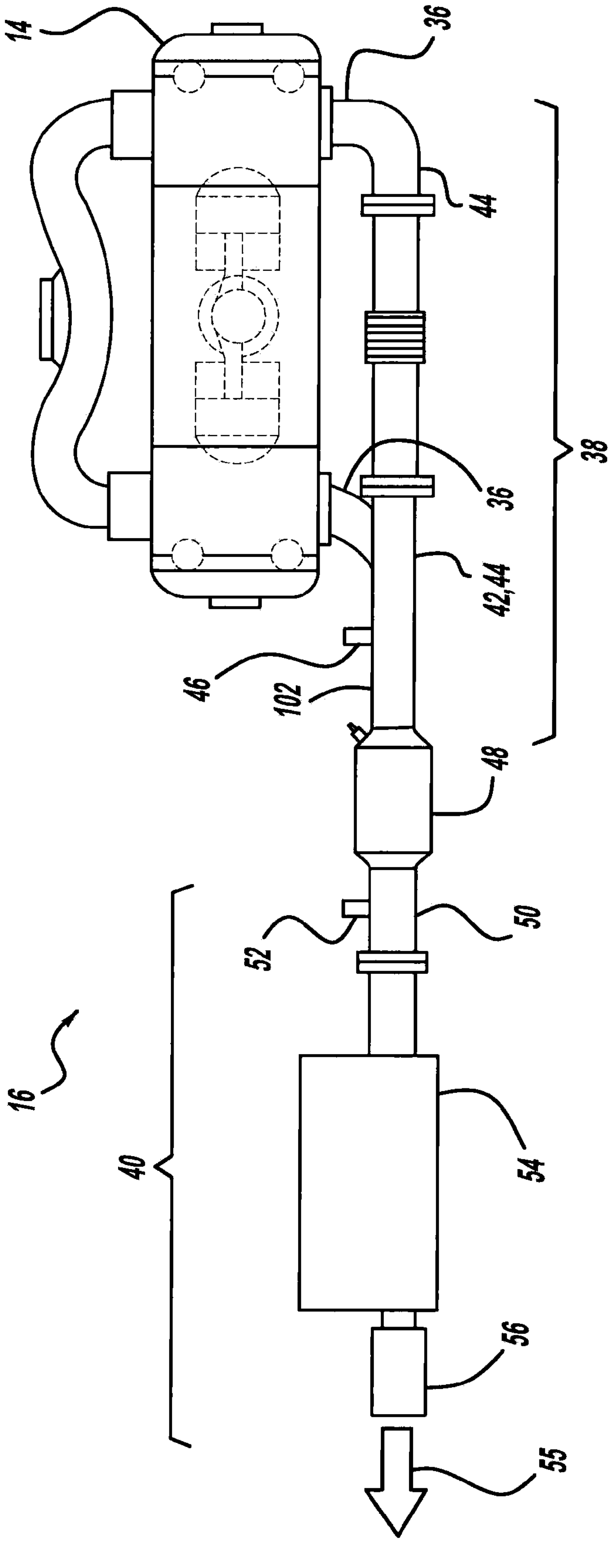
FIG. 2 is a perspective view of an exhaust system according to the present disclosure.

Referring now to FIG. 2, the exhaust system 16 includes an exhaust manifold 36, a mid-pipe region 38, and a cat-back region 40. The exhaust manifold 36 acts as a funnel and collects the exhaust gases from the combustion chambers 22 and releases them through a single opening or pipe 42 into a downpipe 44 in the mid-pipe region 38. Once in the downpipe 44, the exhaust gases pass a first oxygen sensor 46 before entering a catalytic converter 48. The catalytic converter 48 provides an environment for a chemical reaction whereby the exhaust gases are converted to less toxic substances. The reacted exhaust gases are sent to a rear exhaust pipe 50 in the cat-back region 40 where they pass a second oxygen sensor 52. Once in the rear exhaust pipe 50, the reacted exhaust gases are sent to a muffler 54 for reducing noise from engine-generated sound waves that travel in the exhaust gases. This noise reduction assures that the noise emissions comply with acceptable levels. After exiting the muffler 54, the exhaust gases 55 are expelled to the environment through a tail pipe 56. The tail pipe 56 emits the exhaust gases past the end of the vehicle, preventing exhaust gas from entering the vehicle cabin.

While the exhaust system 16 of the present embodiment is depicted as having a single exit path, it should be understood that the arrangement of the exhaust system 16 may vary. Vehicle packaging and design space availability and engine type/size will dictate various other exhaust system modifications including, but not limited to, alternate pipe configurations, added components (e.g. an additional catalytic converter, a resonator, a turbocharger, etc), and/or a duplicated system. For example, in a six-cylinder engine arrangement, such as a V-6, it is common to mirror the exhaust system 16 on both sides of the vehicle. In this way, three cylinders utilize one exhaust system, while the remaining three cylinders utilize an alternate exhaust system. The mirrored exhaust systems may be connected or joined together through piping to utilize a common component, such as a single tail pipe.

Figure 3:
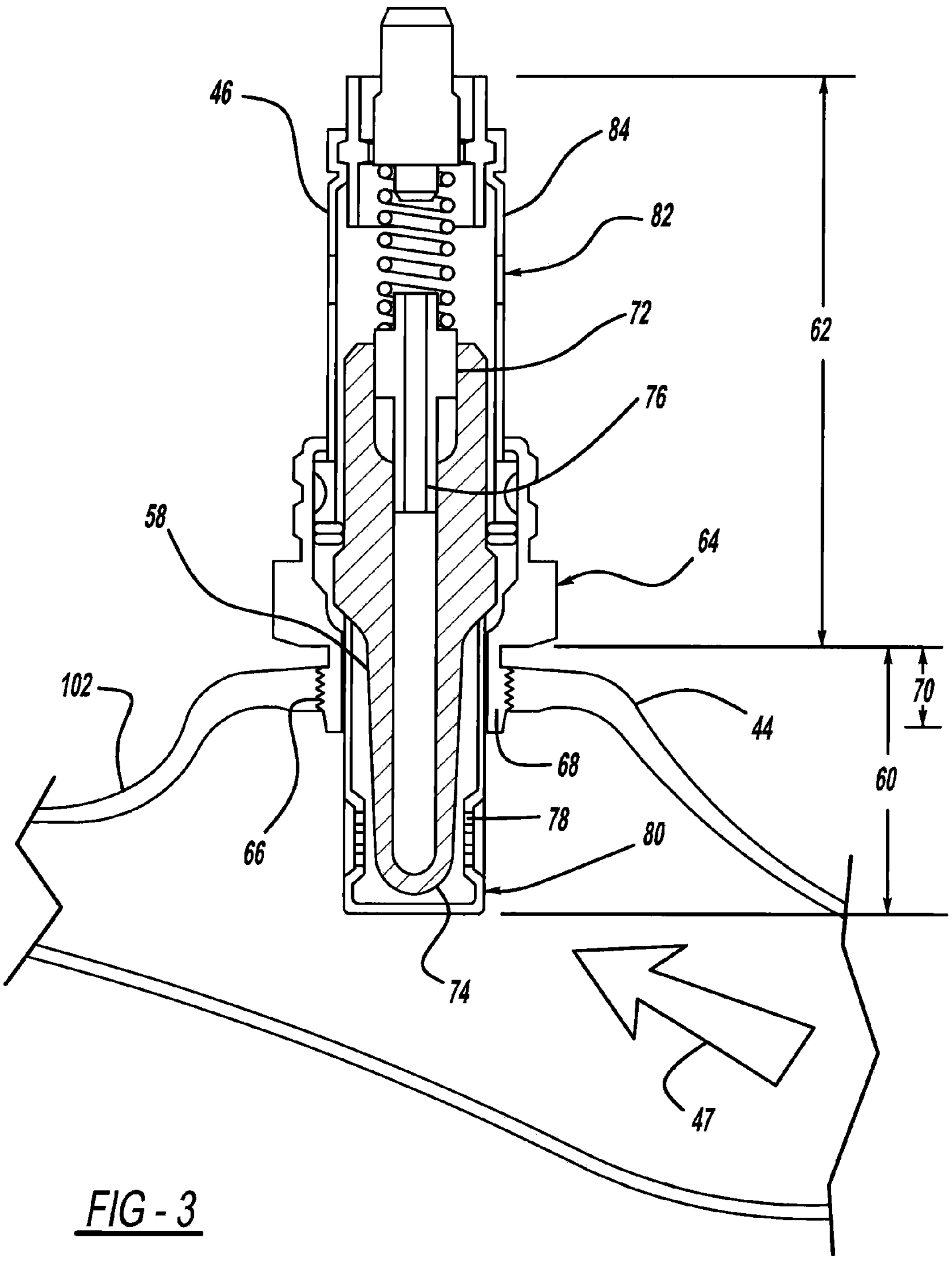
FIG. 3 is a perspective view of an oxygen sensor in the exhaust system according to the present disclosure.

Referring now to FIG. 3, the exhaust system 16 at the interface between the downpipe 44 and the first oxygen sensor 46 is depicted in greater detail. It will be appreciated that the first oxygen sensor 46 may function and/or be constructed in a similar manner to the second oxygen sensor 52. Exhaust gas 47 flows past the first oxygen sensor 46. The oxygen sensor 46 may include an electrode 58, a tip region 60, and a cap region 62. A tool (not shown) receives a nut 64, located in the cap region 62, to screw the oxygen sensor 46 into a threaded hole 66 located in the downpipe 44. A threaded collar 68 on an upper portion 70 of the tip region 60 locates and removably attaches the oxygen sensor 46 to the threaded hole 66. Once seated, the electrode 58 protrudes a predetermined distance into the downpipe 44 and into the flow path of exhaust gas exiting the exhaust system 16. The electrode 58 may be a zirconium dioxide ($ZrO_2$, zirconia) ceramic material plated on inner and outer surfaces 72, 74 with porous platinum. When the electrode 58 is cold, such before the engine is started and exhaust gasses are flowing through the exhaust, the zirconia ceramic material behaves similar to an insulator. However, at elevated temperatures, the zirconia ceramic material behaves as a semi-conductor and generates a voltage output. A heating element 76, encased in the electrode 58, raises the temperature of the electrode 58 to a conductive level in order to alleviate this problem during cold exhaust temperature periods (e.g. at engine startup). At the conductive temperature for the zirconia ceramic (approximately 310° C.), the electrode 58 develops an electrical charge as oxygen ions pass through it.

In operation, exhaust gases exiting the exhaust system 16 pass through holes 78 in a protective shield 80 covering the tip region 60. Oxygen ions in the exhaust gases react with the electrode 58. Similarly, air enters the cap region 62 through holes 82 in an outer casing or shell 84. Oxygen ions in the air also react with the electrode 58. This series of reactions creates an electrical charge in the zirconia ceramic. The strength of the charge depends upon the number of oxygen ions passing through the zirconia ceramic. The inner and outer platinum surfaces 72, 74 accumulate the charge and carry it to an on-board signal communication device 86 (see FIG. 4) for further analysis by the PCM 20.

Figure 4:
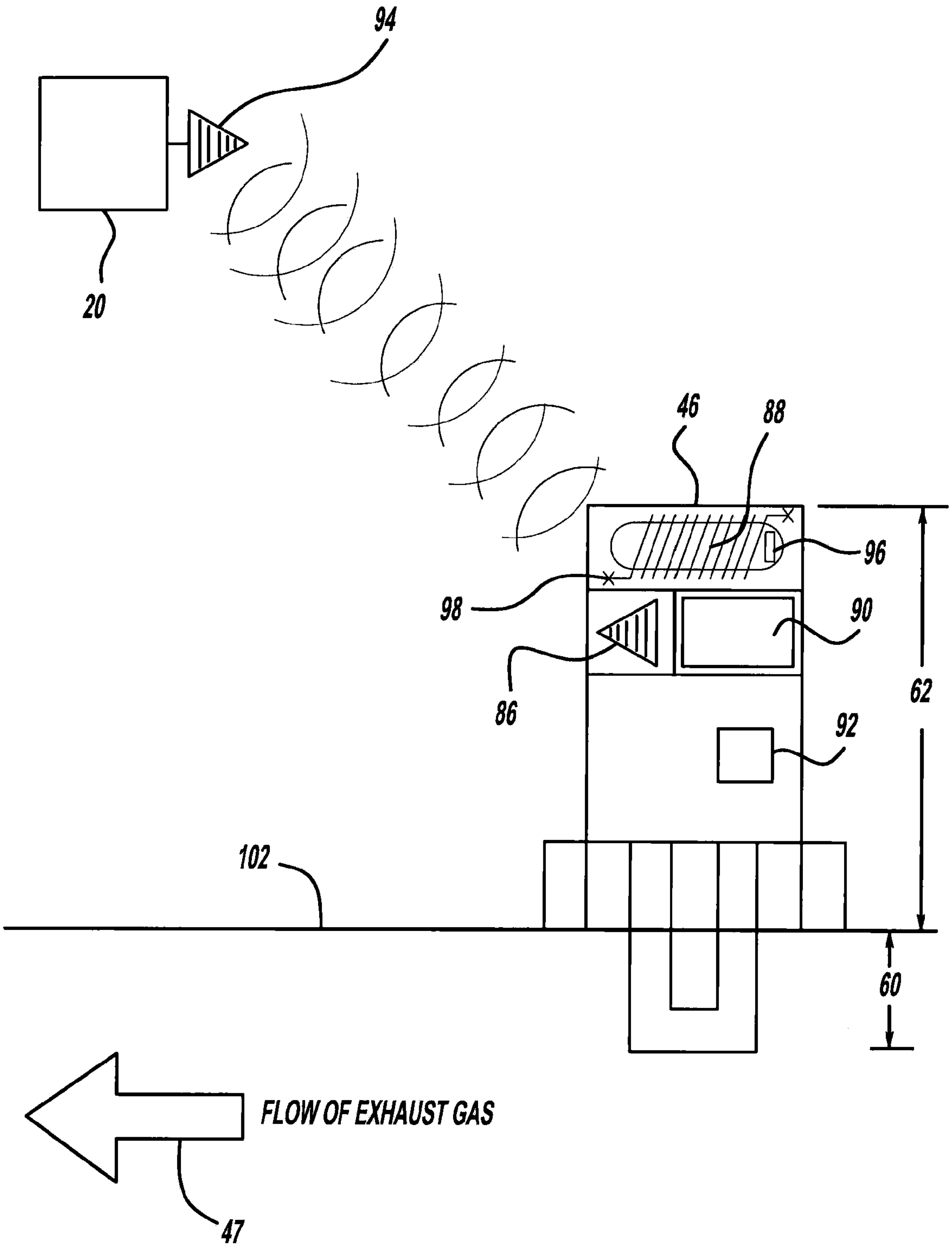
FIG. 4 is an exploded perspective view of the oxygen sensor of FIG. 3.
Figure 5:
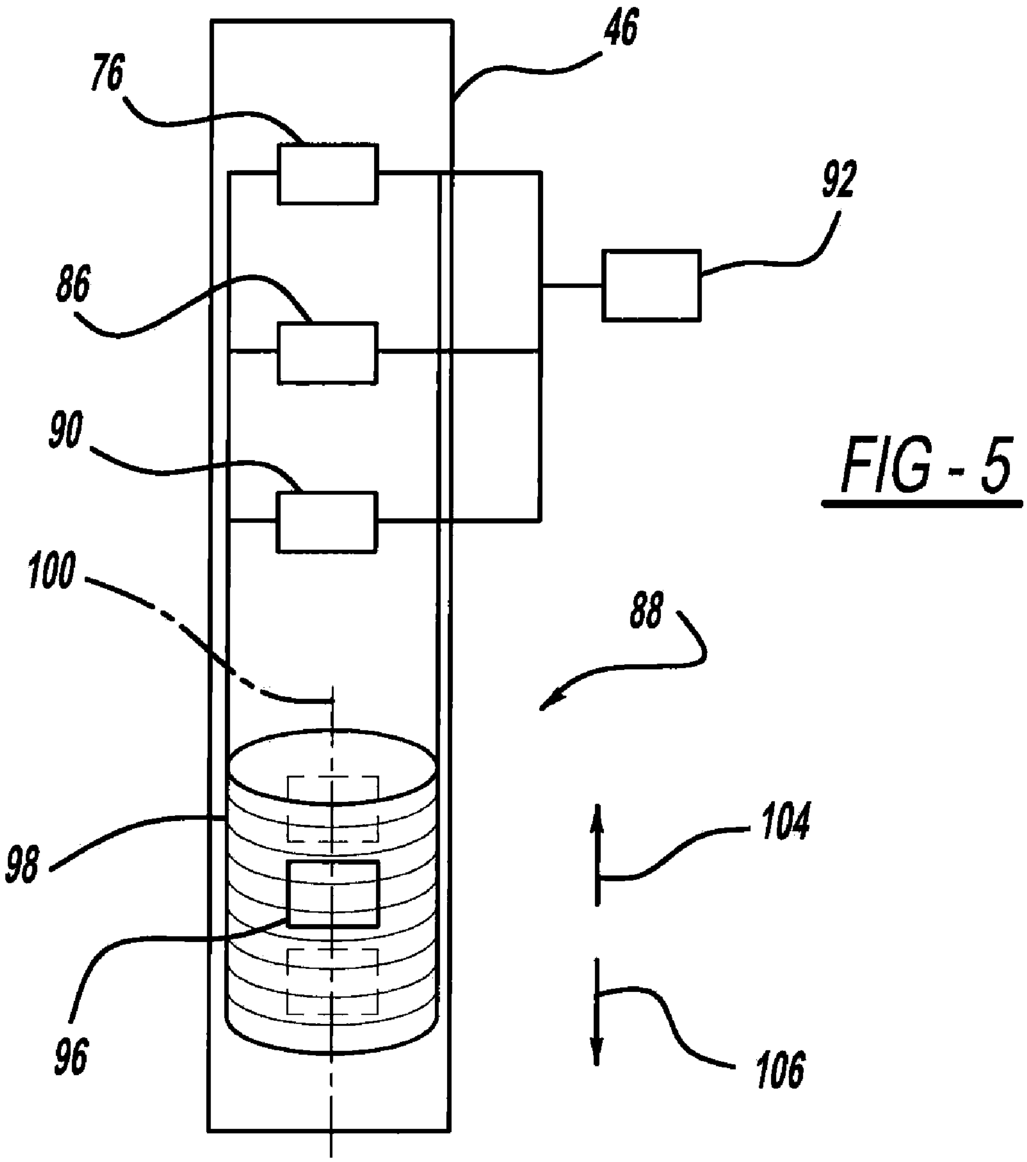
FIG. 5 is an example of a power generation device to generate electricity.

Referring now to FIG. 4, the cap region 62 is shown in greater detail. The cap region 62 of the oxygen sensor 46 includes a linear power generator 88 (e.g. a Faraday type linear power generator), an energy storage capacitor 90, an integrated circuit (IC) chip 92, and the on-board signal communication device 86. While the teachings of the present disclosure recite a capacitor 90 as a device to store energy, such as voltage or current, the device may also be a battery 90, which may be rechargeable, such as a rechargeable battery. Throughout this specification, the capacitor 90 may be replaced with a battery 90, such as a rechargeable battery. The Faraday linear power generator 88 generates power by moving a magnet 96, such as by shaking or vibrating, repeatedly in a coil of wire 98. That is, the magnet 96 moves to and fro in accordance with arrow 104 and arrow 106 in a coil of wire 98 caused by rotation of the engine 14 and road surface vibration and motion transmission through the vehicle body, which reach the linear power generator 88. Such engine vibration and road-supplied motion provides the required motion or movement to shake the magnet 96 in the coil 98 and eliminates the need for external wires from a traditional vehicle battery or traditional alternator to deliver power to the oxygen sensor 46. Each "shake" or vibratory motion of the linear power generator 88 and magnet 96 creates an electrical current that is then stored in the energy storage capacitor 90.

Energy stored in the capacitor 90, or battery, may be used to supply power to both the oxygen sensor 46 and the heating element 76. It should be understood that power or electrical energy generated by the magnet 96 and wire coil 98 may be adjusted to a required level by providing a magnet having a requisite strength or by varying the number of windings of the coil 98. Additionally, the size of the capacitor 90, or battery, may determine the amount or quantity of electrical storage.

Generating electricity has been described in conjunction with a Faraday linear power generator 88.

The IC chip 92 regulates the power supplied to the oxygen sensor 46 and the heating element 76. Additionally, the IC chip 92 sends signals indicating a rich or lean oxygen condition between the oxygen sensor 46 and the PCM 20 through the on-board signal communication device 86. A similar wireless communication device 94 is located in the PCM 20 to wirelessly receive the signals. It should be understood that the IC chip 92, through the signal communication device 86, is also capable of receiving signals and commands transmitted by the PCM 20 from the wireless communication device 94. In such a case, the wireless communication device 94 of the PCM 20 functions as a wireless transceiver 94. Similarly, the signal communication device 86 also may function as a wireless transceiver 86, to send and receive wireless signals.

With continued reference to FIGS. 1-5, the teachings of the present invention may be described as an apparatus that utilizes an oxygen sensor 46, 52 for an engine 14 of a motor vehicle 11. More specifically, the apparatus may employ an outer shell 84, an electrode 58 disposed through the outer shell 84, the electrode 58 for measuring an amount of oxygen in an exhaust gas exiting the motor vehicle engine 14 and for generating a signal based on the measured amount of oxygen. Additionally, disposed within the outer shell 84 may be a wireless electrode transceiver 86 for wirelessly transmitting the signal from the electrode 58, a capacitor 90 to provide power to at least the wireless electrode transceiver 86, and a self-contained power generation device 88, such as a Faraday power generation device. The power generation device 88 may supply electrical power to the capacitor 90 to eliminate the need for external wires from external power sources leading to the capacitor 90.

Furthermore, the apparatus according to the present teachings may employ a powertrain control module 20, and a powertrain control module transceiver 94 such that the wireless electrode transceiver 86 wirelessly communicates with the powertrain control module transceiver 94. With reference including FIG. 5, the self-contained power generation device 88 may further employ a movable magnet 96 and a coil of wire 98 surrounding the magnet 96 such that engine vibration transmitted through the motor vehicle to the self-contained power generation device 88 causes motion of the magnet 96 inside and through the coil 98, in accordance with the direction indicated by arrows 104, 106, to generate electrical current to energize the capacitor 90, or battery. The apparatus may further employ a heating element 76 inside the oxygen sensor 46, 52. The capacitor 90 may supply electrical current to the heating element 76, which may supply conductive level heat to the electrode 58. Engine motion, such as when the internal combustion engine 14 fires and causes vibration, generates an electrical current for storage and use by the capacitor when the magnet 96 moves or vibrates to and from through the coil 98. The heating element 76 regulates temperature of the electrode 58 at a conductive level.

The oxygen sensor 46, 52 may power, via the linear power generator 88, and communicate with a powertrain control module 20 (wireless transceiver 94) in a motor vehicle 11. The apparatus may further comprise an outer casing 84, an electrode 58 disposed through the outer casing 84, the electrode 58 for measuring an amount of oxygen in an exhaust gas exiting the motor vehicle 11 and for generating a signal based on the measured amount of oxygen. Furthermore, the apparatus may employ a wireless electrode transceiver 86 disposed within the outer casing 84 for wirelessly transmitting the signal from the electrode 58 to the powertrain control module 20, a capacitor 90 within the outer casing 84 to provide power to at least the wireless electrode transceiver 86. A self-contained power generation device 88 may be disposed in the outer casing 84 and supply electrical power to the capacitor 90, or battery. The self-contained power generation device 88 may further employ a movable magnet 96 and a coil of wire 98 surrounding the magnet 96 such that engine vibration and motion due to road surface contours are transmitted through the motor vehicle to the self-contained power generation device 88 to move the magnet 96 from inside the coil 98 to outside the coil 98, and back through the coil 98, thereby generating electrical current to energize the capacitor 90, or battery. A powertrain control module transceiver 94 within the powertrain control module 20 wirelessly communicates with the wireless electrode transceiver 86. The powertrain control module 20 is a separate piece, physically separated from the oxygen sensor 46 and the signal communication device 86 (transceiver 86).

The teachings of the present disclosure may also include a heating element 76 inside the oxygen sensor 46 and an electrical connection to electrically connect the capacitor 90 and the heating element 76 using wires within the oxygen sensor 46. The heating element 76 is proximate to the electrode 58 to supply heat to the electrode 58. The powertrain control module 20 and the oxygen sensor 46 communicate wirelessly.

In yet another example, the teachings may employ an oxygen sensor 46 for communicating with a powertrain control module 20 in a motor vehicle 11. More specifically, the oxygen sensor 46 may employ an outer casing 84, an electrode 58 disposed through the outer casing 84, the electrode 58 for measuring an amount of oxygen in an exhaust gas exiting the motor vehicle 11 and for generating a communication signal based on the measured amount of oxygen. Continuing, the apparatus may employ a wireless electrode transceiver 86 disposed within the outer casing 84 for wirelessly transmitting the signal from the electrode 58 to the powertrain control module 20. A capacitor 90 within the outer casing 84 may provide power to at least the wireless electrode transceiver 86. A Faraday-type power generation device 88 disposed in the outer casing 84 may supply electrical power to the capacitor 90. A powertrain control module transceiver 94 within the powertrain control module 20 may wirelessly communicate with the wireless electrode transceiver 86. The powertrain control module 20 is a physically separate part with a measureable, physical distance from the oxygen sensor 46. A longitudinal axis 100 of the coil 98 may be perpendicular to the vehicle engine exhaust pipe 102. A heating element 76 may reside inside the oxygen sensor 46 and an electrical connection may electrically connect the capacitor 90, the heating element 76, and the coil 98. The heating element 76 may be proximate to the electrode 58 to supply heat to the electrode 58.

Still yet, the powertrain control module may communicate with the oxygen sensor to recalibrate the oxygen sensor, which may be necessary as the oxygen sensor ages. For instance, maintaining the correct air/fuel ratio (AFR) for an engine is important for fuel economy, engine life and engine performance. If the AFR mixture has too much fuel, it becomes rich, and the engine will bog, or run improperly. If the mixture has too little fuel, it becomes lean, and the engine may knock, or worse, it will cause incorrect detonation, which may damage an engine. Some narrow band oxygen sensors attempt to keep the engine running as close to stoichometric (14.7:1) as possible while a precise ratio may be read by the sensor at any given engine rpm. This is especially important when keeping the engine in tune with a correct AFR. The powertrain control module may communicate with the oxygen sensor to conduct diagnostics on the oxygen sensor to inquire how the oxygen sensor is performing (reading the AFR).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus utilizing an oxygen sensor for an engine of a motor vehicle, the apparatus comprising:
an outer shell;
an electrode disposed through the outer shell, the electrode for measuring an amount of oxygen in an exhaust gas exiting the motor vehicle and for generating a signal based on the measured amount of oxygen;
a wireless electrode transceiver disposed within the outer shell for wirelessly transmitting the signal from the electrode;
an integrated circuit chip for controlling functions of the oxygen sensor;
a power-storing device within the outer shell to provide power to at least the wireless electrode transceiver and the integrated circuit chip; and
a self-contained power generation device disposed in the outer shell, the power generation device for supplying electrical power to the capacitor.

2. The apparatus of claim 1, further comprising:
a powertrain control module; and
a powertrain control module transceiver, wherein the wireless electrode transceiver wirelessly communicates with the powertrain control module transceiver.

3. The apparatus of claim 1, the self-contained power generation device further comprising:
a movable magnet; and
a coil of wire surrounding the magnet, wherein engine vibration transmitted through the motor vehicle to the self-contained power generation device moves the magnet inside the coil to generate electrical current to energize the power-storing device.

4. The apparatus of claim 3, further comprising:
a heating element inside the oxygen sensor, wherein the heating element supplies conductive level heat to the electrode.

5. The apparatus of claim 4, wherein the power-storing device is a capacitor that supplies electrical current to the heating element.

6. The oxygen sensor of claim 4, wherein the power-storing device is a battery that supplies electrical current to the heating element.

7. The apparatus of claim 6, wherein engine motion generates an electrical current for storage and use by the battery.

8. The apparatus of claim 7, wherein the heating element regulates temperature of the electrode at a conductive level.

9. An oxygen sensor for powering and communicating with a powertrain control module in a motor vehicle, the apparatus comprising:
an outer casing;
an electrode disposed through the outer casing, the electrode for measuring an amount of oxygen in an exhaust gas exiting the motor vehicle and for generating a signal based on the measured amount of oxygen;
a wireless electrode transceiver disposed within the outer casing for wirelessly transmitting the signal from the electrode to the powertrain control module;
a capacitor within the outer casing to provide power to at least the wireless electrode transceiver;
an integrated circuit chip for controlling functions of the oxygen sensor;
a self-contained power generation device disposed in the outer casing, the power generation device for supplying electrical power to the capacitor, the self-contained power generation device further comprising:
a movable magnet; and
a coil of wire surrounding the magnet, wherein engine vibration transmitted through the motor vehicle to the self-contained power generation device moves the magnet inside the coil to generate electrical current to energize the capacitor; and
a powertrain control module transceiver within the powertrain control module, wherein the wireless electrode transceiver wirelessly communicates with the powertrain control module transceiver and the powertrain control module is separate from the oxygen sensor.

10. The apparatus of claim 9, further comprising:
a heating element inside the oxygen sensor.

11. The apparatus of claim 10, further comprising:
an electrical connection to electrically connect the capacitor and the heating element.

12. The oxygen sensor of claim 11, wherein the heating element is proximate to the electrode to supply heat to the electrode.

13. The apparatus of claim 12, wherein the powertrain control module and the (46) communicate wirelessly.

14. An oxygen sensor for powering and communicating with a powertrain control module in a motor vehicle, the apparatus comprising:
an outer casing;
an electrode disposed through the outer casing, the electrode for measuring an amount of oxygen in an exhaust gas exiting the motor vehicle and for generating a signal based on the measured amount of oxygen;
a wireless electrode transceiver disposed within the outer casing for wirelessly transmitting the signal from the electrode to the powertrain control module;
an integrated circuit chip for controlling functions of the oxygen sensor;
a capacitor within the outer casing to provide power to at least the wireless electrode transceiver and the integrated circuit chip;
a Faraday-type power generation device disposed in the outer casing, the power generation device for supplying electrical power to the capacitor; and
a powertrain control module transceiver within the powertrain control module, wherein the wireless electrode transceiver wirelessly communicates with the powertrain control module transceiver and the powertrain control module is separate from the oxygen sensor.

15. The apparatus of claim 14, further comprising:
a vehicle engine exhaust pipe, the power generation device further comprising:
a coil of wire; and
a magnet surrounded by the coil of wire, wherein the coil of wire is mounted to the vehicle engine exhaust pipe such that a longitudinal axis of the coil is perpendicular to the vehicle engine exhaust pipe.

16. The apparatus of claim 15, further comprising:

a heating element inside the oxygen sensor; and an electrical connection to electrically connect the capacitor and the heating element.

17. The oxygen sensor of claim 16, wherein the heating element is proximate to the electrode to supply heat to the electrode.

18. The apparatus of claim 17, wherein the powertrain control module are wireless communication devices.

19. The apparatus of claim 18, wherein the powertrain control module communicates with the oxygen sensor to recalibrate the oxygen sensor.

20. The apparatus of claim 18, wherein the powertrain control module communicates with the oxygen sensor to conduct diagnostics on the oxygen sensor.

* * * * *

UNITED STATES PATENT AND TRADEMARK OFFICE

CERTIFICATE OF CORRECTION

PATENT NO. : 8,078,388 B2
APPLICATION NO. : 12/349890
DATED : December 13, 2011
INVENTOR(S) : Patrick Powell It is certified that error appears in the above-identified patent and that said Letters Patent is hereby corrected as shown below:

Title Page, Title should be --FARADAY TYPE WIRELESS OXYGEN SENSOR--
Col. 1, line 1, Title should be --FARADAY TYPE WIRELESS OXYGEN SENSOR--
Col. 7, line 34, claim 1, delete “capacitor” and insert --power-storing device--
Col. 7, line 55, claim 6, delete “oxygen sensor” and insert --apparatus--
Col. 7, line 63, claim 9, delete “apparatus” and insert --oxygen sensor--
Col. 8, line 26, claim 10, delete “apparatus” and insert --oxygen sensor--
Col. 8, line 28, claim 11, delete “apparatus” and insert --oxygen sensor--
Col. 8, line 34, claim 13, delete “apparatus” and insert --oxygen sensor--
Col. 8, line 35, claim 13, delete “46” and insert --oxygen sensor--
Col. 8, line 38, claim 14, delete “apparatus” and insert --oxygen sensor--
Col. 8, line 60, claim 15, delete “apparatus” and insert --oxygen sensor--
Col. 9, line 1, claim 16, delete “apparatus” and insert --oxygen sensor--
Col. 9, line 8, claim 18, delete “apparatus” and insert --oxygen sensor--
Col. 10, line 1, claim 19, delete “apparatus” and insert --oxygen sensor--
Col. 10, line 4, claim 20, delete “apparatus” and insert --oxygen sensor--

Signed and Sealed this
Twenty-sixth Day of June, 2012

David J. Kappos

*Director of the United States Patent and Trademark Office*